Aug. 4, 1959     I. G. FOWLER ET AL     2,897,632
METHOD OF PRODUCING PATTERN-CUT BENT GLASS SHEETS
Filed Oct. 27, 1954     3 Sheets-Sheet 1
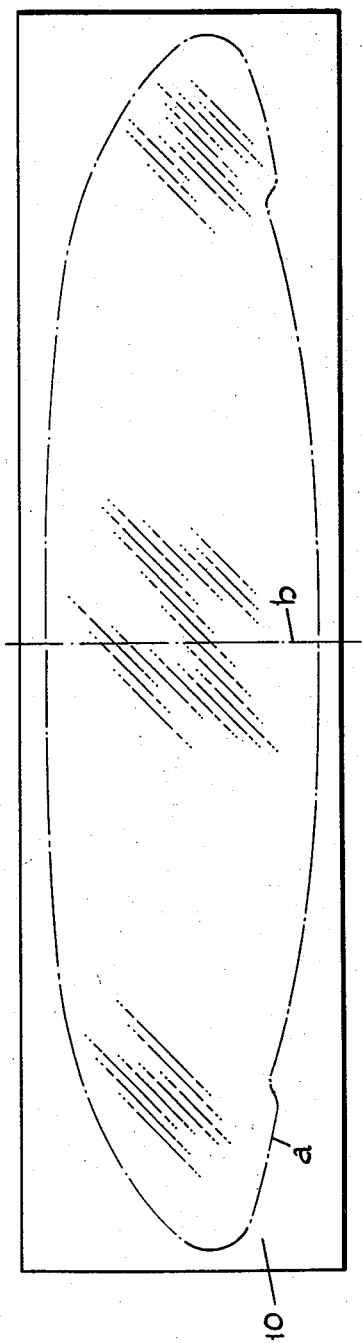
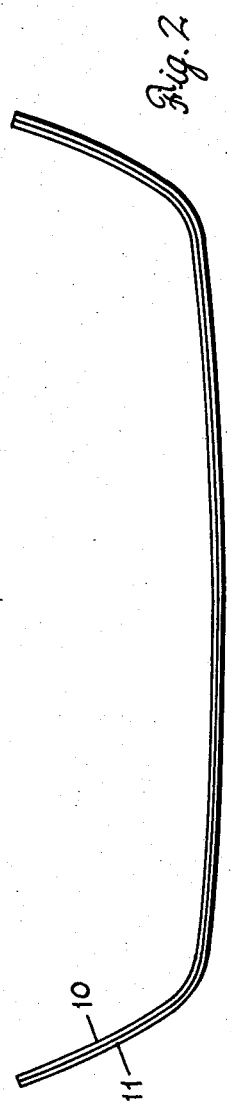
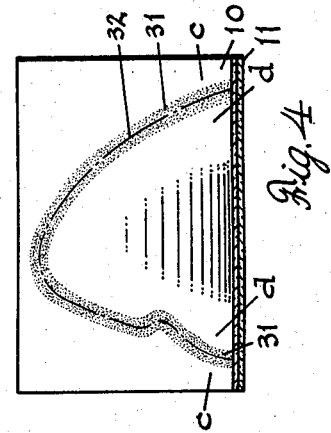
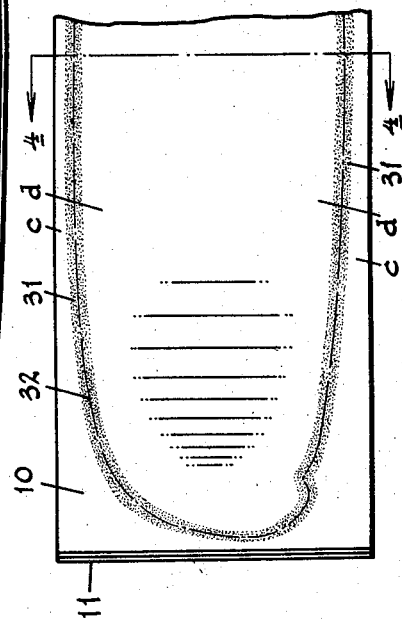
INVENTORS
Ival G. Fowler and
BY Donald W. Dunipace
Nobbe & Swope
ATTORNEYS

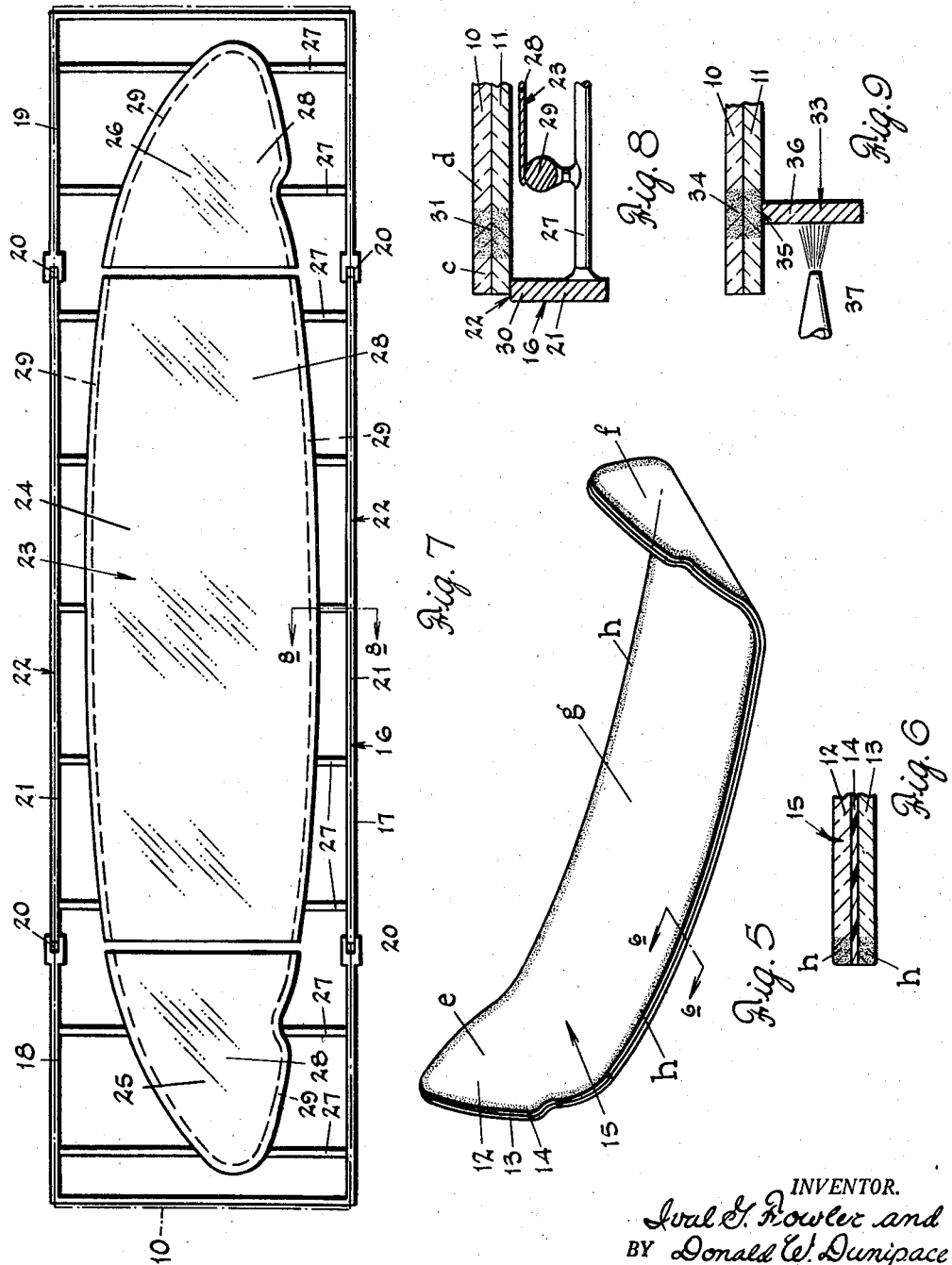

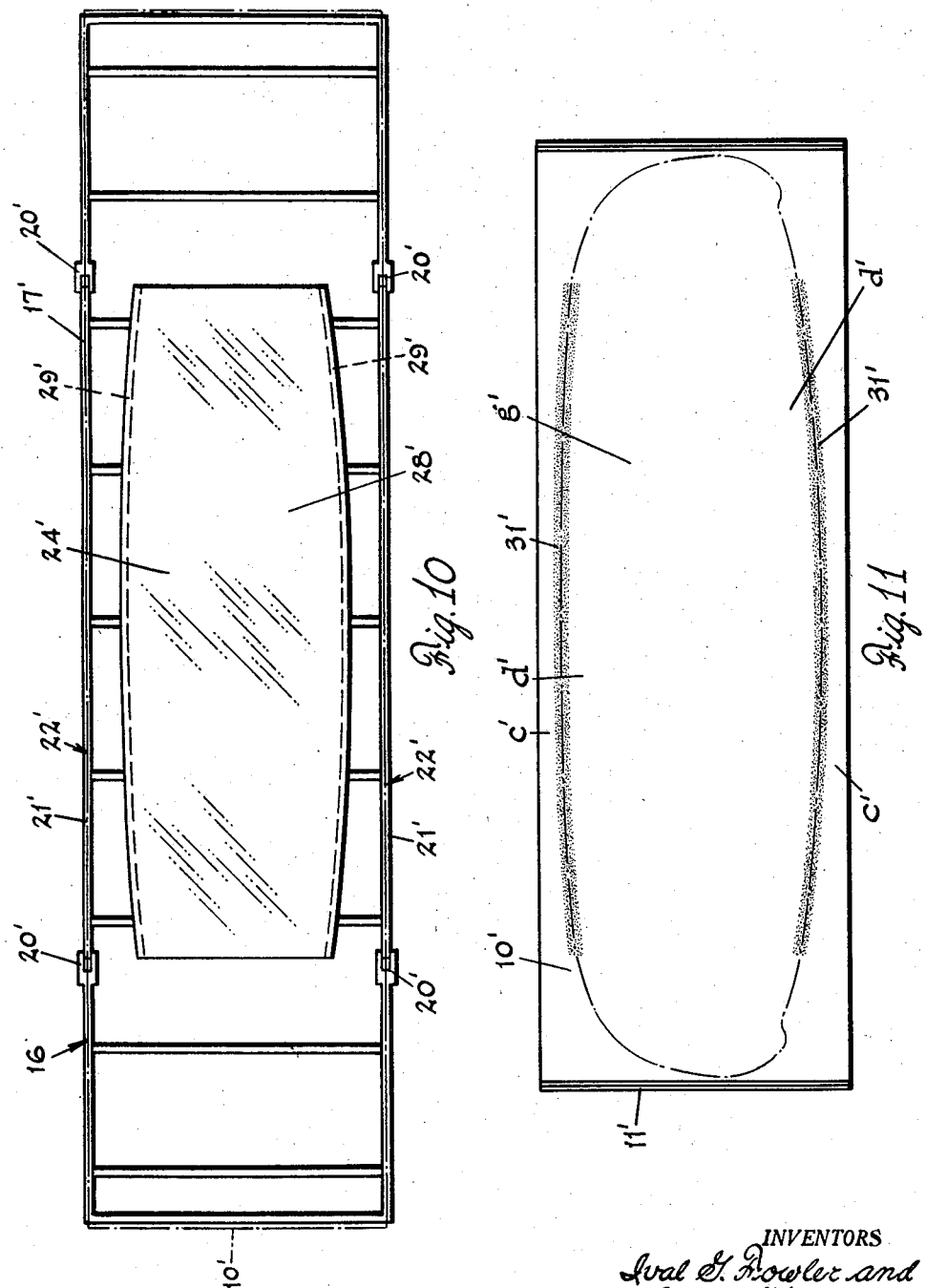

2,897,632

METHOD OF PRODUCING PATTERN-CUT BENT GLASS SHEETS

Ival G. Fowler, Toledo, and Donald W. Dunipace, Perrysburg, Ohio, assignors to Libbey-Owens-Ford Glass Company, Toledo, Ohio, a corporation of Ohio Application October 27, 1954, Serial No. 464,952

9 Claims. (Cl. 49—79)

The present invention relates broadly to an improved method of bending glass sheets or plates. More particularly, it has to do with a novel method of increasing the strength of such articles by controlling the orientation or arrangement of their regional strain patterns, and with bent glass units that have been strengthened in this way.

This application is a continuation-in-part of our copending application, Serial No. 416,179, filed March 15, 1954, now abandoned.

Although not necessarily restricted thereto, this invention is of particular importance in producing bent windshields for automobiles and, to date, has found its greatest commercial utility in connection with so-called "panoramic" or "wrap-around" windshields which are designed to give wide angle vision to the driver and passengers and are exemplified by being curved or bent, not only across the entire front of the car, but also sharply rearwardly at both sides to provide generally triangularly shaped ears which extend well into the corners and side areas of the automobile.

For commercial purposes, panoramic or wrap-around bends have been defined as any curved or bent glass having longitudinal sections determined by multiple radii, with a larger radius or radii determining the central section (or a flat central section) and smaller radii determining sharper bends in the sections toward the ends.

Because such structures involve extremely complex bends, which generally include the combination of bends having curvatures in different planes with bends that have different curvatures in the same plane, they are particularly susceptible to the setting up of disruptive or weakening strains therein during production and processing; and, at the same time, the actual monetary loss from breakage is unusually high because of the skilled man hours and high equipment costs that go into the finished bent windshields.

This is additionally true because, in the United States, all present day automotive windshields are of laminated safety glass which is made up of two sheets or plates of glass with an interposed layer of non-brittle thermoplastic material all bonded together under heat and pressure to form a composite structure. This necessitates the bending of the glass sheets in pairs so that they will accurately conform to and nest with one another when subsequently laminated with the plastic interlayer. For these reasons, in standard commercial production, windshield blanks are usually bent two at a time on so-called outline or periphery molds.

These outline or periphery molds are conventionally made up of relatively thin rails, arranged to form a frame-like structure of a pattern that follows the outline or periphery of the glass sheet, with the upper surface of the rails providing the shaping surface of the mold and conforming to the shape into which it is desired to bend a glass sheet. A mold of this general type is disclosed in the patent to J. E. Jendrisak, 2,551,607, issued May 8, 1951. As therein shown, the rails of such a mold may be composed of a plurality of sections hinged together to permit the mold to be lifted into an open position to receive an unbent sheet or sheets and to move under the influence of gravity into a closed, bent sheet supporting position as the glass softens and sags toward its desired bent shape.

Molds of the above character have the distinct advantage of restricting the area of the glass surface that is contacted by the mold during bending to a relatively narrow band around the margin, and of making it possible to bend glass sheets for windshields without the viewing area of the sheets ever coming into contact with any part of the mold.

However, a serious amount of edge breakage and distortion in bent glass, and particularly in bent glass for panoramic windshields, that has been produced on these molds has been encountered and we have determined that this breakage and distortion is due largely to inherent defects in the generally accepted bending practices that have heretofore been followed in using periphery type molds.

To illustrate, it has been conventional practice in the automotive glass industry to first cut the glass sheets to pattern and then bend them by placing them on a periphery type bending mold and exposing the glass sheets on the mold to an elevated temperature at which the glass will bend and sag into conformity with the shaping surface of the mold. Immediately after bending, the bent glass sheets are annealed on the mold by gradually lowering the temperature through the annealing range of the glass, i.e., from the bending temperature of the glass to a point at which undesirable strains will not be set up in the glass by uncontrolled cooling.

In a procedure as described above, wherein the glass sheets are pattern cut to windshield size prior to bending them, it has been customary to employ a periphery or outline mold of a shape and size that will engage the glass surface at or as near the edge of the sheet as possible so that any mold scratches or similar defects in the finished bent sheet will be concealed by the windshield mounting.

Subsequently it was found that distortion of the bent glass along the mold contact areas sometimes encountered in bending such pattern-cut sheets could be avoided by first bending the glass in generally rectangular "block" or "blank" sizes and then pattern cutting the windshield shapes from these bent block or blank sheets. In this latter procedure, it was considered desirable, in order to avoid excessive trim loss, to have the rails of the block size mold as near as possible to the line along which the bent sheet was subsequently to be cut.

However, edge breakage of windshields produced by this procedure became a serious problem until we developed the theory that such edge breakage was due to the presence, in the regional strain pattern, of a tension strip or band extending along the central portion of the edge of the finished bent glass sheet and which was the direct result of the bending practice.

Thus, it will be noted that in both the pattern-cut and block size bending procedures outlined above, at least the central portions of the edge areas along the sides of the finished bent sheet inherently fall at or very near the narrow areas or bands of glass that were directly over the side rails of the mold during bending and annealing of the bent sheet.

Therefore, during annealing of the bent glass on the mold, the cooling of the area which contained, or was to constitute the central side edges of the finished bent sheet was being retarded by the mass of the mold rails with the result that there was produced a continuous strip or band along the central area of the peripheral side edge of the finished bent sheet that was in tension. It is known that glass is weak in tension and from this, it follows that the tension areas, or tensile regions, in the regional strain pattern of a glass sheet will be weak areas and, consequently, the areas that are most susceptible to breakage. Therefore, the glass sheets produced in this way could theoretically be expected to have a peripheral edge portion that is particularly susceptible to breakage.

To test our theory, we bent a nested pair of rectangular glass sheets by the standard block size bending procedure and then pattern cut the bent sheets in the usual manner. In observing the strain pattern of the bent sheets on a polariscope with tint plate prior to cutting, it was seen that the block size pair had a narrow outside band of compression (blue color) amounting to as much as 2000 p.s.i. at the extreme edge. Inside of this compression band was a rather wide band of tension (yellow color) reaching a maximum value of 1000 to 1200 p.s.i. Inside of this tension band was another compression area (blue color).

However, when these block size bent sheets were cut to pattern, the line of cut went through and along the tension area (yellow streak) and due to some redistribution of stress, the outside edges then had a tensional value ranging from 350 to 100 p.s.i., with an average value of 650 p.s.i. The two sheets were then laminated together with a nonbrittle thermoplastic interlayer and it was found that the laminating procedure made no significant change in the regional stress pattern exhibited.

Another pair of similar glass sheets were then bent in the same way and an examination of their strain patterns showed the regional stresses to be substantially the same as described for the preceding pair. However, this pair of bent sheets were cut down to remove the tension area so as to make the outside cut edges fall in the inner compression area. The resulting regional strain along the outer edge had a compression value of 44 p.s.i. as compared with a tensile stress of 650 p.s.i. in the first pair of sheets after cutting. The second pair was then laminated with a plastic interlayer and again practically no change was made in the stress pattern.

Among other things, these tests demonstrated that the strain pattern as produced in known block size bending remains essentially unchanged through subsequent pattern cutting and laminating. In other words, if the pattern is cut from the block size sheet along a line such that the peripheral edge of the pattern-cut sheet is in compression, the finished lamination will have compression along its edges.

It also became evident that bent glass units of greater mechanical strength, and which are much more resistant to edge breakage, could be produced if the placement or arrangement of their regional strain patterns could be suitably controlled during processing; that is, if the normal position of the compression region in the strain pattern of bent block size sheets could be shifted to a position coinciding with the edge of the finished bent sheet, particularly along the central side area of such sheet.

This invention therefore is based on our discoveries: (1) that any area of a bent glass sheet whose cooling in the annealing range has been retarded, as by the mass of the bending mold, will be found to be in tension; (2) that the mechanical strength and resistance to breakage of a bent glass sheet are greatly increased when its edge is in compression such as when the tension and compression areas in its regional strain pattern have been so located as to provide a compression area, band or strip at the peripheral edge of the unit and; (3) that there are a number of different ways in which the compression areas in the regional strain pattern of a sheet of bent glass can be shifted, positioned or rearranged during the production of such a unit.

It is therefore the primary aim of this invention to provide a bent glass sheet of superior physical strength, and one that is especially resistant to edge breakage, by placing at least selected areas of the edge of the bent sheet in compression.

Another object is the provision of novel techniques for orienting the regional strain pattern of a bent glass sheet so as to provide a continuous regional compression band at and extending along the peripheral edge of the sheet.

Another object is to shift the compression area in the regional strain pattern of a bent block size glass sheet by controlling the temperature of the mold after bending and during annealing of the glass.

Another object is to modify the regional strain pattern in a bent block size glass sheet by counterbalancing the thermal effect of the mass of the mold on the glass after bending and during the annealing thereof.

A further object is the provision of a method of bending block size sheets that are to be subsequently pattern cut so that the pattern-cut bent sheets will have a greater resistance to edge breakage, which comprises bending a block size sheet while at its bending temperature, annealing the bent sheet, and retarding the cooling action in the annealing range of spaced areas of glass along and at opposite sides of a line along which the block size bent sheet is to be pattern cut.

A further object is to provide such a method in which a predetermined area of the block size sheet inwardly of the outer edge thereof is cooled more rapidly than contiguous areas to form an area which is in compression, and to subsequently cut the block size bent sheet along a line such that at least selected portions of the peripheral edge of the pattern-cut sheet will be in compression.

A still further object is the provision of such a method in which the retarding of the cooling of the glass in the annealing range results in the creation of spaced areas of tension and an intermediate area of compression in the glass sheet, and then pattern cutting the bent glass sheet along a line running through the area of compression.

Other objects and advantages of the invention will become more apparent during the course of the following description, when taken in connection with the accompanying drawings.

In the drawings, wherein like numerals are employed to designate like parts throughout the same:

Fig. 1 is a view of a rectangular flat block size sheet of glass from which an outline is to be pattern cut in accordance with this invention;

Fig. 2 is a side view of a pair of block size glass sheets after they have been bent;

Fig. 3 is a plan view of a portion of the bent sheets shown in Fig. 2, and which are to be pattern cut along the line indicated in broken lines;

Fig. 4 is a transverse section taken substantially on line 4—4 of Fig. 3;

Fig. 5 is a perspective view of a completed windshield;

Fig. 6 is a detail sectional view taken substantially on line 6—6 of Fig. 5;

Fig. 7 is a diagrammatic plan view of a bending mold upon which the block size sheets may be bent;

Fig. 8 is a fragmentary sectional view through the mold taken substantially on line 8—8 of Fig. 7 and showing the practice of this invention;

Fig. 9 is a view similar to Fig. 8 but showing a modified form of the invention;

Fig. 10 is a plan view similar to Fig. 7 but illustrating another modified form of the invention; and Fig. 11 is a view similar to Fig. 3 but illustrating a pair of glass sheets that have been bent on the mold of Fig. 10.

Briefly stated, the method of this invention comprises supporting one or a pair of flat glass blanks or block size sheets that are to be subsequently pattern cut above an outline or peripheral type mold; heating the glass to bending temperature whereupon the sheet or sheets will soften and bend downwardly by gravity to take the contour of the mold; annealing the bent sheet or sheets by gradually reducing the temperature thereof from the bending temperature of the glass to a temperature below which undesirable strains will not be put into the glass by sudden chilling; selectively retarding the cooling of the glass in the annealing range to create, inwardly of the peripheral edges of the sheet or sheets, a regional compression band or area corresponding substantially to the outline of the sheet to be pattern cut therefrom, and then cutting the glass along the compression band in such a way that at least selected portions of the outer peripheral edges of the pattern-cut sheet or sheets will be in compression.

With reference now to the drawings, there is shown in Fig. 1 a rectangular sheet or plate of glass 10 which will hereinafter be referred to as the glass blank or block size sheet. Within this block size sheet, there is indicated in broken lines *a* the outline of a sheet to be pattern cut therefrom, and which is preferably symmetrical on both sides of the medial line indicated at *b*. The outline *a* is of course representative of only one of many patterns that may be cut from the glass blank.

As previously pointed out, in making laminated glass windshields it is customary to bend the glass sheets in pairs, and in Fig. 2 is illustrated two block size sheets 10 and 11 that have been simultaneously bent to a desired curvature preliminary to being pattern cut. It will be noted that the two sheets are properly nested or in matched conformity with one another.

Consequently, a pair of bent sheets, after being pattern cut, can then be laminated with an interlayer of non-brittle thermoplastic material, such as polyvinyl butyral resin, to provide a composite safety glass structure such as is shown in Figs. 5 and 6 and which comprises the two pattern-cut sheets of glass 12 and 13, with a plastic interlayer 14 to produce a windshield 15. The form of windshield shown in Fig. 5 is a representative windshield made in accordance with the invention in which the end portions *e* and *f* are curved abruptly relative to the central or middle portion *g* thereof and in which there is provided a continuous compression band or strip *h* at and extending along the entire peripheral edges of the glass sheets.

In bending glass sheets in pairs, it has been customary to locate the two flat sheets to be bent one upon the other on an outline or peripheral type mold which is then conveyed into and through a suitable furnace in which the glass is softened and the two sheets caused to bend downwardly to conform to the contour of the shaping surfaces of the mold, after which they are annealed and cooled on the mold before being removed from the furnace.

As stated above, when the glass sheets have been bent and are supported upon the mold, the rails or shaping surfaces of the mold in contact with the glass sheets act to retard the cooling of the sheets along the areas of contact and ordinarily result in a band of tension in the sheets coinciding with the rails or shaping surfaces of the mold so that if the sheets were subsequently cut along this band, it would result in a band of tension, and a corresponding weakness at that portion of the cut edge of the bent sheets.

It is the purpose of this invention to so control the glass temperatures, during annealing of the glass sheets after bending, that at least certain selected areas of tension which have resulted from former bending techniques along the line on which the sheet would be cut are replaced by an area or areas of compression. The invention not only contemplates the selective locating of compression regions in this way, but provides different procedures for doing so. For example, (1) by controlling the temperature of the mold while the newly bent glass is being annealed thereon; and (2) by purposely setting up relatively heavy or extensive tension areas at both sides of the path along which the glass is to be pattern cut so that balancing of the strains during annealing will provide a relatively heavy compression band between these tension areas and at both sides of what will become the cut edge of the finished bent glass sheet.

One method of locating areas of regional strain in this way is illustrated in Figs. 7 and 8, wherein is disclosed a rectangular mold 16 of substantially the shape and size as the rectangular block size sheets 10 and 11 to be bent. This mold may be of the multiple hinge type illustrated in the above-mentioned Jendrisak Patent 2,551,607, and comprises a central section 17 and opposite end sections 18 and 19 hinged to said central section as at 20. However, instead of the shaping surfaces of the peripheral mold being arranged to conform to the cut pattern of the glass, these block size molds are generally rectangular in shape, with the rails 21 carrying the rectangularly arranged shaping surfaces 22 which serve to define the ultimate curvature of the glass sheets during bending, and which act to retard the rate of cooling of the marginal portions of the glass sheets in contact therewith during annealing.

According to the invention, the width and position of the compression band 31 (Figs. 3 and 4) or *h* in Fig. 5, may be determined by the relation of a shield or baffle plate 23 to the shaping surface of the mold. This shield, which is carried by and positioned beneath the shaping surface of the mold, is of an outline corresponding to the shape of the sheet to be pattern cut from the block size sheet but is of a relatively smaller size. The shield is preferably composed of a central section 24 and end sections 25 and 26, each of which is carried by rods 27 transversely disposed between and secured to the respective mold sections.

The shield 23 comprises a relatively thin membrane 28 which is carried by a body 29 which may be in the form of a bar, rod or other mass of metal located near the glass sheet and conforming to the contour of the sheet to be pattern cut from the block size sheet. It will be noted that the body 29 is spaced inwardly of the rails 21 to provide masses of metal at either side of the intended cut line, and the rails and the body will act to retard cooling of the glass in the areas in contact therewith or immediately adjacent thereto during annealing.

After the block size sheets have been bent and passed into the annealing zone of the furnace, the residual heat in the surface areas 30 of rails 21 will operate to retard or create a differential in the rate of cooling along the margins of the glass. However, at the same time the body 29 will affect the areas of the sheets thereabove to similarly retard the cooling along a line inwardly of the glass margin. This retarding of the cooling of the glass sheets along spaced longitudinally extending areas coincident with the shaping surface 30 and body 29 will cause the retarded areas to be placed in tension while the area therebetween will be in compression. As a result, the bands of tension *c* and *d*, which are set up on either side, will define a compression area 31 between, in which the cut may be made. Not only is the area between the tension bands where the cut is to be made in compression, but we have found that because of the inherent tendency of the compression and tension areas to balance, the additional presence of the cooling retarding body 29 during annealing will give a heavier compression band than could otherwise be obtained. The arrangement of the compression band 31 between the opposite areas of tension *c* and *d* in the bent block size sheets is shown in Figs. 3 and 4. The numeral 32 designates the line of cut which is to be made within the compression band so that the peripheral edge of the pattern-cut sheet will be in compression.

While this locating of the line of cut, for producing the pattern-cut sheet, within the compression band of the block size sheet will normally produce a pattern-cut sheet with a peripheral edge that is in compression, it is possible that a cut made in the compression band, but too near to the boundary between the compression band and one of the tension areas, might result in a pattern-cut sheet with a peripheral edge in tension. This is due to the natural tendency of the compressional and tensional forces to rebalance, and the resulting redistribution of stresses, after the pattern-cut sheet has been removed from the block size. For the same reason, it may be possible to produce a pattern-cut sheet having a peripheral edge in compression by locating the line of cut in one of the tension areas of the block size sheet providing it was closely enough adjacent to the compression band.

In other words, in practicing this invention it is preferred that the line of cut for the pattern-cut sheet be located within the compression band in the block size sheet. However, it is only necessary, in order to practice the invention, that the line of cut be so positioned relative to the compression band in the block size sheet that the peripheral edge of the bent sheets, after having been pattern cut therefrom, will be in compression.

In another form of the invention shown in Fig. 9, the block size sheets can be bent upon a mold 33, with the area 34, along which the cut for the central area of the pattern-cut, bent sheet is to be subsequently made, located directly above and in contact with the shaping surfaces 35 of the mold. This may give more accurate control of the bent shape and, by positively cooling the mold rails 36, by suitable cooling means 37, the mold temperature can be so controlled that cooling of the glass in contact therewith will not be retarded and, in fact, it can be accelerated so as to produce a relatively heavy compression band in the area 34 directly above the mold rails and so greatly increase the mechanical strength of the glass and the resistance of the sheet to edge breakage.

Although, as indicated above, this invention contemplates the positioning of regions of compression along selected areas of the peripheral edges of finished, bent glass sheets, as well as positioning continuous compression bands entirely around the peripheral edges of such sheets, it will be noted that the embodiments of the invention so far described have been intended primarily to produce the continuous bands of compression entirely around the margin or periphery of the finished article.

Generally speaking, we prefer these procedures because we feel that a compression band which extends entirely around a finished bent panoramic windshield gives maximum strength and resistance to breakage. However, we have discovered that it is possible to produce bent panoramic or wrap-around windshields that are commercially satisfactory from the stand-point of resistance to breakage, and that will successfully and repeatedly stand up under the normal rough usage incident to the mounting of these severely bent laminated glass sheets into the sight opening of an automobile, by the provision of compression regions in selected areas only of the bent glass sheets. When employing this embodiment of the invention, however, it is essential that the location of the compression areas be predetermined and very carefully selected.

Briefly stated, we have found that commercially satisfactory panoramic or wrap-around windshields will result if the edges or the marginal edge portions of the central section $g$ of the windshield, between the areas defined by the relative smaller radii or sharper bends in the sections $e$ and $f$ toward the ends of the windshield, are in compression along the major portion of their lengths. In other words, we have found that when the edges of the flat or relatively slightly curved central section of the windshield are in compression a commercially satisfactory article of normally adequate strength results even though the edge portions of all or most of the balance of the windshield is in much lighter compression, in neutral stress, or even in tension.

This discovery has greatly facilitated the production of these very difficult to bend articles and permits the use of normal bending molds without expensive alterations for the purpose of removing hinges and other relatively massive metal parts of the mold from locations where they might retard the cooling action of the end portions of the glass during annealing.

In Fig. 10 of the drawings, there has been illustrated a simplified form of the mold shown in Fig. 7 and which may be used to practice the embodiment of the invention just discussed. This mold, designated 16', is identical with the mold 16 of Fig. 7 except that the end portions 25 and 26 of the shield 23 have been removed leaving only the central portion 24' and its directly associated bodies 29'.

The operation of this mold is identical with that of the mold illustrated in Figs. 7 and 8, so far as its effect on setting up alternate compression and tension areas in the central area $g'$ of the bent sheet. In other words, after bending in block size on this mold the glass sheets 10' will have compression bands 31' at opposite edge regions of the sheets and lying between tension areas $c'$ and $d'$.

It will be understood that the broad aspects of this invention may be practiced in a number of specifically different ways in addition to those described here. For example, any procedure, such as the shifting of the relative positions of the glass and mold, that will locate the area in which the score line is to be made in a block size sheet out of the normal tension area that is created by the mass of the mold during annealing, will at least approach the results obtained by the general technique described above.

Similarly, the setting up of a compression band in the area of the score line by temperature control can also be done in a number of different ways. Thus, it must be remembered that a compression band will be created whenever the cooling of the glass within that band is accelerated during annealing. Obviously, this can be done by cooling the mold by other means and by different cooling media than that specifically described. It may also be done by directly cooling, during annealing, the area of the glass which it is desired to place in compression.

In fact, it is to be understood that the forms of the invention herewith shown and described are to be taken as illustrative embodiments only of the same, and that various changes in the shape, size and arrangements of parts, as well as various procedural changes may be resorted to without departing from the spirit of the invention or the scope of the subjoined claims.

We claim:

1. A method of bending block size sheets of glass that are to be subsequently pattern cut so that the pattern-cut bent sheets will have a greater resistance to edge breakage, which comprises bending a block size sheet while at its bending temperature, gradually cooling the bent sheet from bending temperature through the annealing temperature range, cooling a substantially continuous band-like area of the block size sheet spaced inwardly of the outer edge thereof more rapidly than contiguous areas to form an area which is in regional compression through the thickness of the sheet, and subsequently pattern cutting the block size sheet along a line running through said compression area.

2. A method of bending block size sheets of glass that are to be subsequently pattern cut so that the pattern-cut bent sheets will have a greater resistance to edge breakage, which comprises bending two block size sheets of glass, positioned one upon the other, simultaneously on an outline mold while at their bending temperature, gradually cooling the bent sheets so positioned from bending temperature through the annealing temperature range, effecting the cooling of relatively closely spaced areas of the block size sheets through the annealing temperature range at a lower rate than an intermediate area between said spaced areas to place the intermediate area in regional compression through the thickness of the sheets, and subsequently cutting the block size sheets to pattern along lines such that the peripheral edges of the pattern-cut bent sheets will be in compression.

3. A method of bending block size sheets of glass that are to be subsequently pattern cut so that the pattern-cut bent sheets will have a greater resistance to edge breakage, which comprises bending two block size sheets of glass, positioned one upon the other, simultaneously on an outline mold while at their bending temperature, gradually cooling the bent sheets through the annealing temperature range while said sheets are positioned one upon the other on the mold, cooling a substantially continuous band-like area of the block size sheets inwardly of the outer edges thereof and about the periphery thereof more rapidly than contiguous areas while the sheets are being cooled through the annealing temperature range to form an area which is in regional compression through the thickness of the sheets, and subsequently pattern cutting the block size sheets along lines such that the peripheral edges of the pattern-cut bent sheets will be in compression.

4. A method of bending block size sheets of glass that are to be subsequently pattern cut so that the pattern-cut bent sheets will have a greater resistance to edge breakage, which comprises bending two block size sheets of glass, positioned one upon the other, simultaneously on an outline mold while at their bending temperature, cooling the bent sheets from bending temperature through the annealing temperature range while the sheets are on the mold, and retarding the cooling action in the annealing range of relatively closely spaced areas of glass extending along and at opposite sides of a line along which the block size bent sheets are to be pattern cut to set the sheet area therebetween in compression throughout the thickness of the sheet, and cutting the sheet along said line to form a pattern-cut bent sheet having its edge set in compression.

5. A method of treating a glass sheet to form a pattern cut bent glass sheet having the edge thereof in compression, comprising heating a glass sheet to bending temperature and bending said sheet into conformity with a bending mold, gradually cooling the sheet while supported on the mold from bending temperature through the annealing temperature range, while the sheet is on the mold retarding the cooling of said sheet in relatively closely spaced apart sheet areas to set the sheet area therebetween in compression throughout the thickness of the sheet, and subsequently cutting the sheet to pattern along a line running through a portion of the sheet area set in compression.

6. A method of bending a glass sheet as defined in claim 5, wherein the sheet area having the cooling thereof retarded includes a substantially continuous marginal strip extending about the entire periphery of the sheet.

7. A method of producing pattern-cut bent glass sheets having their edges set in compression and having greater resistance to edge breakage, which comprises supporting a sheet to be bent above a contour type mold, heating the sheet to bending temperature and until it bends into contact with the mold, gradually cooling the bent sheet on said mold from bending temperature through the annealing temperature range, during said cooling through the annealing temperature range setting up a band-like strip in the sheet set in compression at and substantially entirely around an area of said sheet and through the thickness of said sheet that substantially coincides with the desired edge of the finished pattern-cut bent glass sheet to be produced by cooling said band-like strip in the sheet at a more rapid rate than said portions inwardly and substantially coextensive with said strip to set said strip in compression, and cutting the sheet along said band-like strip to form a pattern-cut sheet having its edge set in compression.

8. A method of producing pattern-cut bent glass sheets having their edges set in compression and having greater resistance to edge breakage, which comprises bending a glass sheet while at its bending temperature on a contoured type mold, gradually cooling the bent sheet on the mold from bending temperature through the annealing temperature range, reducing the temperature of the glass along a substantially continuous strip coinciding with the desired edge outline of the finished bent and pattern-cut glass sheet to be produced at a more rapid rate relative to the balance of the sheet during cooling thereof through the annealing temperature range to set said strip in compression throughout the thickness of the sheet and cutting the sheet to pattern outline along said compression strip.

9. In a method of producing pattern-cut bent glass sheets having greater resistance to edge breakage, the steps of bending a glass sheet while at its bending temperature on a contoured type outline mold, gradually cooling the bent sheet while on said mold from bending temperature through the annealing temperature range, reducing the temperature of the glass along the area thereof that is in direct contact with the mold more rapidly than the temperature of the other areas of the sheet are reduced during cooling of the sheet through the annealing temperature range to set a substantially continuous band about the periphery of the sheet in compression through the thickness of the sheet, and cutting the sheet along said compression band to form a pattern-cut bent glass sheet having its edge set in compression.

References Cited in the file of this patent

UNITED STATES PATENTS

| | | |
|---|---|---|
| 1,632,363 | Bull | June 14, 1927 |
| 1,713,854 | Meyer | May 21, 1929 |
| 1,889,881 | Thompson | Dec. 6, 1932 |
| 1,980,970 | Monro | Nov. 13, 1934 |
| 1,988,565 | Owen | Jan. 22, 1935 |
| 2,176,999 | Miller | Oct. 24, 1939 |
| 2,177,324 | Long | Oct. 24, 1939 |
| 2,218,654 | Paddock | Oct. 22, 1940 |
| 2,348,278 | Boyles et al | May 9, 1944 |
| 2,518,896 | Jendrisak | Aug. 15, 1950 |
| 2,683,334 | Rugg et al. | July 13, 1954 |
| 2,691,854 | Rugg | Oct. 19, 1954 |
| 2,720,729 | Rugg | Oct. 18, 1955 |
| 2,762,166 | Vent | Sept. 11, 1956 |

FOREIGN PATENTS

| | | |
|---|---|---|
| 644,410 | Germany | Apr. 30, 1937 |
| 609,921 | Great Britain | Oct. 8, 1948 |
| 1,038,439 | France | May 6, 1953 |
| 1,063,312 | France | Dec. 16, 1953 |
| 704,312 | Great Britain | Feb. 17, 1954 |

UNITED STATES PATENT OFFICE
CERTIFICATE OF CORRECTION

Patent No. 2,897,632                             August 4, 1959

Ival G. Fowler et al.

It is hereby certified that error appears in the printed specification of the above numbered patent requiring correction and that the said Letters Patent should read as corrected below.

Column 3, line 22, for "100 p.s.i." read -- 1000 p.s.i. --.

Signed and sealed this 12th day of January 1960.

(SEAL)
Attest:

KARL H. AXLINE
Attesting Officer

ROBERT C. WATSON
Commissioner of Patents